Dec. 18, 1934.  C. C. FARMER  1,984,870
LOCKING ANGLE COCK
Filed Dec. 9, 1933   2 Sheets-Sheet 1
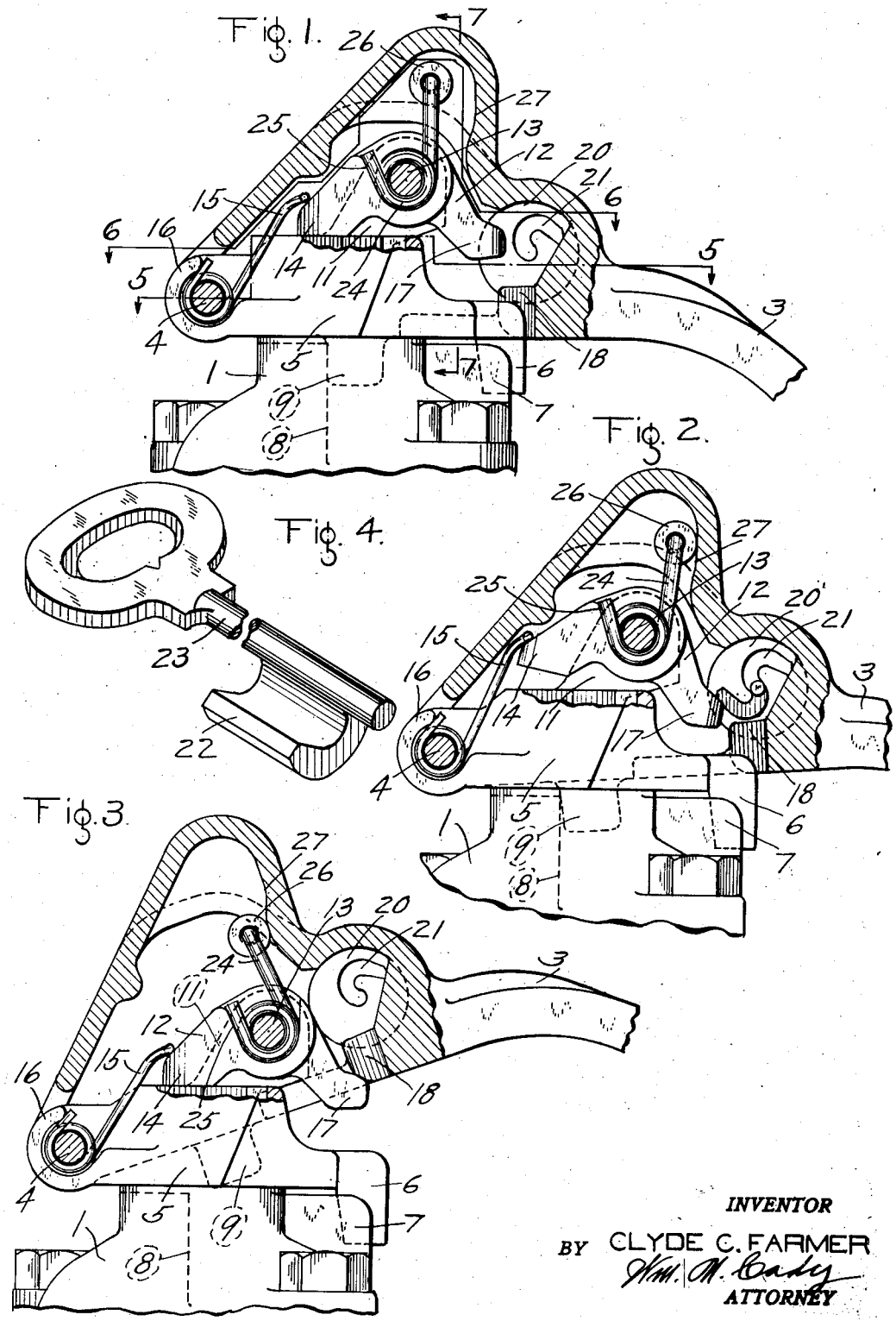
INVENTOR
BY CLYDE C. FARMER
ATTORNEY Dec. 18, 1934.  C. C. FARMER  1,984,870
LOCKING ANGLE COCK
Filed Dec. 9, 1933    2 Sheets-Sheet 2
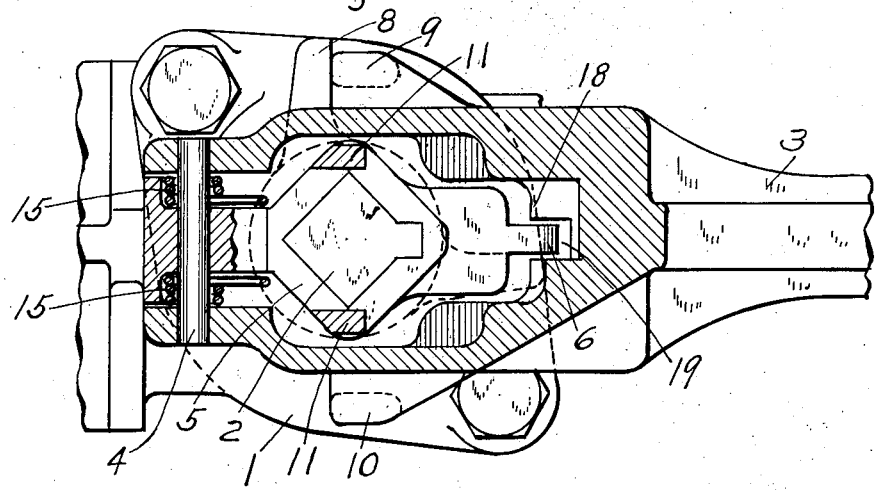
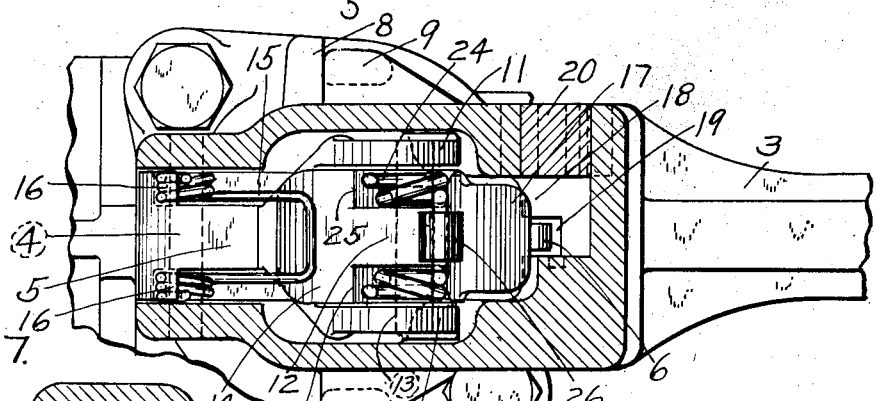
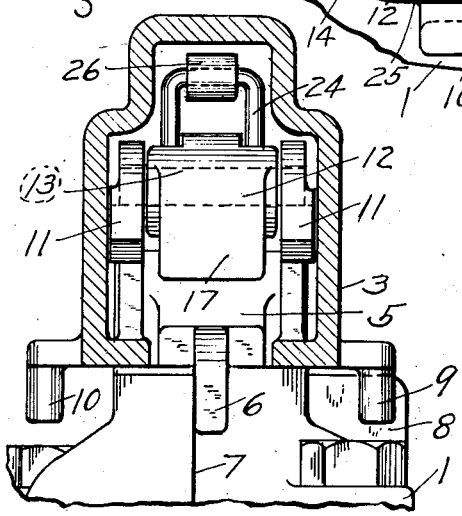
INVENTOR
CLYDE C. FARMER
BY
ATTORNEY Patented Dec. 18, 1934

1,984,870

UNITED STATES PATENT OFFICE 1,984,870

LOCKING ANGLE COCK

Clyde C. Farmer, Pittsburgh, Pa., assignor to The Westinghouse Air Brake Company, Wilmerding, Pa., a corporation of Pennsylvania Application December 9, 1933, Serial No. 701,649

11 Claims. (Cl. 70—124)

This invention relates to locking cock devices and more particularly to a locking angle cock of the type employed in railway service for controlling communication, at each end of a car, from the brake pipe on the car to the brake pipe of a connected car.

It has sometimes happened that an angle cock in the train brake pipe has been closed by an unauthorized person or has been negligently closed, so that the engineer loses control of the brakes on the cars at the rear of the closed angle cock.

When a train is made up the angle cock at the rear end of the rear car of the train and the angle cock at the head end of the locomotive are both closed and if either of these angle cocks is opened the engineer loses control of the brakes on the train.

Under either of these conditions, serious accidents are liable to happen, as the engineer cannot properly control the brakes.

The principal object of the invention is to obviate the above difficulty by providing an improved locking cock which may be locked in either the open or closed position of the cock and which can only be opened by a key which a trainman keeps in his possession.

Under some conditions of service it may be desirable to maintain the cock unlocked so that it may readily be moved to its open and closed position without having to resort to the use of a key, and another object of the invention is to provide a locking cock which can be locked in its open or its closed position only upon the application of manual pressure to the handle thereof.

Other objects and advantages will appear in the following more detailed description of the invention.

In the accompanying drawings, Fig 1 is a side view, partly in section, of a portion of a locking cock embodying my invention, with the handle of the cock locked in the cock open position; Fig. 2 is a similar view illustrating the manner of unlocking the handle of the cock; Fig. 3 is a similar view with the handle of the cock unlocked; Fig. 4 is a perspective view of a key unlocking the handle locking means; Figs. 5 and 6 are horizontal sectional views on the lines 5—5 and 6—6, respectively, of Fig. 1; and Fig. 7 is a fragmentary end elevational view, partly in section, of the cock device, the sectional portion of the view being on the line 7—7 of Fig. 1.

As shown in the drawings, the angle cock device may comprise the cock body 1 in which the usual plug valve (not shown) is rotatably mounted, said plug valve being operated through the medium of the usual valve stem 2 which is rotatably mounted in the cock body and further comprises an operating handle 3.

The handle 3 is pivoted, by means of a pin 4, to a valve stem operating member 5 which is secured to the valve stem. The member 5 is provided with a lug 6 adapted to engage stops 7 and 8 in the cock body when the valve stem is turned to its respective valve open and valve closed positions.

The handle is provided with lugs 9 and 10, the lug 9 being adapted to engage the stop 8 when the handle is in the valve open position, and the lug 10 being adapted to engage the stop 7 when the handle is in the valve closed position.

The member 5, which is secured to the valve stem, is provided with spaced upwardly extending lugs 11, between which there is disposed a locking latch or bolt 12 which is rockably mounted, intermediate its ends, on a pin 13 extending between and carried by the lugs 11. The end 14 of this locking bolt is adapted to rest on the upper surface of the member 5 and is subject to the action of spring 15 which at all times tends to force the end 14 of the locking bolt to its position of rest on the member 5, the inner end portions of the spring being mounted on the pin 4 and anchored against rotation by lugs 16 on the member 5. With the end 14 of the locking bolt at rest on the member 5, the other end, 17, of the locking bolt extends into the path of travel of a lug 18 carried by the handle where it is adapted to engage with the lug 18 to prevent the handle from being raised a sufficient distance to effect the disengagement of the lug 9 from the stop 8, so that the handle and parts operatively associated therewith cannot be moved to their valve open position.

The lug 18 is provided with a notch 19 which is adapted to accommodate the lug 6 of the member 5 when the handle is in its valve open position as shown in Fig. 1.

The inner end of the handle 3 is made in the form of a hood which encloses the locking bolt 12, and has mounted in one of the side walls of the hooded portion an escutcheon 20 having a key opening 21 which is shaped to permit the insertion of a peculiarly shaped bolt operating cam 22 having an operating shank 23 through the medium of which the cam is adapted to be rotated.

Mounted on the pin 13 and straddling the locking bolt 12 is a torsion spring 24 having its ends abutting spaced lugs 25 formed in the locking bolt 12 at a point to the left of pivot pin 13, the lugs preventing rotation of the ends of the spring in a counterclockwise direction relative to the pin when the locking bolt is in its locking position as shown in Figs. 1 and 3. The central portion of the spring extends upwardly on the right hand side of the pin 13 and is provided with a roller 26 which is adapted to engage with the interior surface of a wall 27 of the hooded portion of the handle as shown in Figs. 2 and 3 for the purpose of urging the handle toward its lower or locked position.

Assuming the angle cock device to be locked in its closed position as shown in Figs. 1, 5, 6 and 7 and it is desired to open it, the trainman inserts the cam portion 22 of the key into the handle through the key opening 21 in the escutcheon 20. When the key is thus positioned, the trainman lifts the handle 3 and at the same time rotates the cam portion 22 in a clockwise direction causing the cam to engage the end 17 of the locking bolt 12 after which the cam, as its rotation is continued, causes the locking bolt to rock forwardly to a position out of the path of travel of the lug 18 of the handle as shown in Fig. 2. As the handle is being raised from the position in which it is shown in Fig. 2 the key is rotated still further so as to maintain the locking bolt in the position shown, thus permitting the upper edge of the lug 18 to pass the upper edge of the end of the locking bolt, and further upward movement of the handle causes the lug 18 to pass above the end 17 of the locking bolt as shown in Fig. 3. As the locking bolt is being rocked to its unlocking position with relation to the handle 3 as just described the interior surface of the wall 27 of the handle engages the roller 26 on the spring 24 so that as the handle is raised the spring is torsioned. When the lug 18 passes above the end 17 of the locking bolt both springs, 15 and 24, act to tilt the locking bolt rearwardly to the position in which it is shown in Fig. 3. It will be noted that with the handle 3 raised as shown in Fig. 3, the lug 9 is out of locking engagement with the stop 8 so that the handle can now be moved to its valve closed position.

In operation the handle 3 may be lifted far enough that the lug 18 is out of engagement with the end 17 of the locking bolt, and when this is the case, the spring 24 acts to assist in moving the handle downwardly to the position in which the lug 18 rests on the end of the locking bolt. It will here be understood that the handle 3, when the operator releases his hold thereon, will move downwardly into engagement with the end 17 of the locking bolt. The springs 15 and 24 acting on the locking bolt 12 prevent the handle from rocking the locking bolt forwardly, so that the handle will be held raised in an unlocked position. If it should be desired to lock the angle cock device in its unlocked position, the operator forces the handle downwardly causing the locking bolt 12 to rock forwardly to permit the lug 18 to pass below the end 17 of the locking bolt 12. As the upper surface of the lug 18 passes the upper surface of the end 17 of the locking bolt the spring 15 acts to rock the bolt rearwardly which positions the end 17 of the bolt in the path of travel of the lug 18 where it is adapted to engage the lug 18 and prevent the handle from being raised high enough to disengage the lug 10 from the stop 7, the lug 10 having been moved into locking engagement with the stop 7 when the handle was depressed by the trainman.

Once the handle 3 has been locked in the valve closed position the trainman must use the key to unlock it, the unlocking operations being the same as described in connection with the unlocking of the handle in the valve open position.

When the handle is moved from its valve closed position to its valve open position the locking bolt 12 will support the handle in its unlocked position until depressed by the trainman and when depressed the locking bolt will act to lock the handle in its valve open position in the same manner as when the handle is depressed in the valve closed position.

It will be understood that the above described construction may be locked in either a valve open position or a valve closed position against movement except by a person provided with the proper key, and it is intended that the trainman shall keep possession of the key and be held responsible for the same. This construction also provides for the maintaining of the handle unlocked in either the valve open or valve closed position until manually depressed by the trainman.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of locking means adapted to engage said handle to prevent the handle from being moved out of locking engagement with said stop and being adapted to be moved to a position for permitting the handle to be moved out of locking engagement with the stop, said locking means being adapted to support said handle in the last mentioned position until the handle is manually depressed.

2. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of locking means adapted to engage said handle to prevent the handle from being moved out of locking engagement with said stop and being adapted to be moved to a position for permitting the handle to be moved out of locking engagement with the stop, said locking means being adapted to engage said handle in the last mentioned position, and means associated with the locking means for conditioning the locking means to support the handle in the last mentioned position until the handle is manually depressed.

3. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of a pivoted member adapted to engage the handle to prevent the handle from being moved out of locking engagement with said stop and being adapted to be rocked to a position out of locking relation with the handle, and means for rocking the pivoted member into supporting position with respect to the handle when the handle is moved out of locking engagement with said stop.

4. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of a pivoted member adapted to engage the handle to prevent the handle from being moved out of locking engagement with said stop and being rockable to a position out of locking relation with the handle, said pivoted member being automatically movable to a position for supporting said handle when the handle is lifted out of locking engagement with said stop.

5. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of a pivoted member adapted to engage the handle to prevent the handle from being moved out of locking engagement with said stop and being rockable to a position out of locking relation with the handle, said pivoted member being automatically movable to a position for supporting said handle when the handle is lifted out of locking engagement with said stop and automatically movable into locking position with relation to the handle upon the depression of the handle from its supported position.

6. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of a pivoted member adapted to engage the handle to prevent the handle from being moved out of locking engagement with said stop and being rockable to a position out of locking relation with the handle, said pivoted member being automatically movable to a position for supporting said handle when the handle is lifted out of locking engagement with said stop and movable out of its handle supporting position and into its handle locking position upon the manual depression of the handle from its supported position.

7. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of locking means adapted to engage said handle to prevent the handle from being moved out of locking engagement with said stop and being movable to a position for permitting the handle to be moved out of locking engagement with the stop, means yieldably resisting movement of the locking means to the last mentioned position for moving the locking means into position for supporting said handle upon movement of the handle out of locking engagement with said stop, and means for moving the handle into engagement with the locking means when, after the handle has been moved out of locking engagement with said stop, the handle is released by an operator.

8. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of locking means adapted to engage said handle to prevent the handle from being moved out of locking engagement with said stop and being movable to a position for permitting the handle to be moved out of locking engagement with the stop, said locking means being movable to position for supporting the handle out of locking engagement with said stop, and means tending to move the handle into engagement with the locking means after the handle has been moved out of locking engagement with said stop.

9. The combination with a cock device having a rotatable valve stem, a handle for rotating the valve stem and a stop adapted to be engaged by the handle to lock the handle against movement to rotate the valve stem, said handle being movable vertically in one direction out of locking engagement with the stop and movable in the opposite direction into locking engagement with the stop, of locking means adapted to engage said handle to prevent the handle from being moved out of locking engagement with said stop and being movable to a position for permitting the handle to be moved out of locking engagement with the stop, said locking means being movable to position for supporting the handle out of locking engagement with said stop, and a spring cooperating with said locking means and said handle for moving the handle into engagement with the locking means when after being moved out of locking engagement with said stop the handle is released by an operator.

10. The combination with a cock device having a rotatable valve stem, a member for rotating the valve stem, a stop, and a handle for rotating said member, said handle being pivotally mounted on said member and adapted to be moved pivotally downwardly into engagement with said stop to prevent the rotation of the member and adapted to be moved pivotally upwardly out of engagement with the stop to permit the rotation of the member, of a bolt mounted on said member adapted to prevent the handle from being moved upwardly out of locking engagement with said stop and movable to a position for permitting the handle to be moved upwardly out of engagement with the stop and also being movable to a position to engage and support said handle upon movement of the handle out of engagement with said stop.

11. The combination with a cock device having a rotatable valve stem, a member for rotating the valve stem, a stop, and a handle for rotating said member, said handle being pivotally mounted on said member and adapted to be moved pivotally downwardly into engagement with said stop to prevent the rotation of the member and adapted to be moved pivotally upwardly out of engagement with the stop to permit the rotation of the member, of a locking bolt mounted on said member adapted to prevent the handle from being moved upwardly out of locking engagement with said stop and movable to a position for permitting the handle to be moved upwardly out of engagement with the stop and also being movable to a position to engage and support said handle upon movement of the handle out of engagement with said stop, said locking bolt being adapted to support said handle out of engagement with said stop until the handle is manually moved downwardly from its supported position.

CLYDE C. FARMER.